(12) United States Patent
Slaughter et al.

(10) Patent No.: US 6,276,918 B1
(45) Date of Patent: Aug. 21, 2001

(54) DOUGH CUTTING APPARATUS

(76) Inventors: Marion W. Slaughter, 1902 Spillers, Houston, TX (US) 77047; David P. Slaughter, 8732 Camfield Way St., Frisco, TX (US) 75034; Bob G. McKinney, 2301 E. Bayshore Dr., Palacios, TX (US) 77465

( * ) Notice: Subject to any disclaimer, the term of this patent is extended or adjusted under 35 U.S.C. 154(b) by 0 days.

(21) Appl. No.: 09/370,204

(22) Filed: Aug. 9, 1999

(51) Int. Cl.[7] .................................................. A21C 11/10
(52) U.S. Cl. ............................ 425/289; 30/124; 30/303; 249/DIG. 1
(58) Field of Search ............................... 425/289; 30/124, 30/136, 299, 302, 303, 312; 426/503, 512, 518; 249/DIG. 1

(56) References Cited

U.S. PATENT DOCUMENTS

| | | | |
|---|---|---|---|
| 337,329 | * | 3/1886 | Hewett ................................ 30/301 |
| 1,110,946 | * | 9/1914 | Lahiere ................................ 30/305 |
| 1,495,211 | * | 5/1924 | Smolk ................................ 30/305 |
| 1,697,902 | * | 1/1929 | Burke ................................ 30/305 |
| 3,121,450 | * | 2/1964 | Cronheim ........................ 241/101.1 |
| 3,363,589 | * | 1/1968 | Addington ........................ 425/289 |
| 4,055,892 | * | 11/1977 | Del Vecchio ........................ 30/303 |
| 4,606,716 | * | 8/1986 | McCaffrey ........................ 425/289 |
| 5,848,470 | * | 12/1998 | Anderson ........................ 30/277 |

* cited by examiner

*Primary Examiner*—Nam Nguyen
*Assistant Examiner*—Donald Heckenberg
(74) *Attorney, Agent, or Firm*—Bill B. Berryhill

(57) ABSTRACT

Dough cutting apparatus including a plurality of spaced apart blades the lower edges of which are uniformly curved from one end of said blades to the other and a plurality of intersecting spaced apart blades the lower edges of which are straight. The blades cooperate to form multiple uniformly sized cavities therebetween. A handle is attached to the blades for engagement by the user of the apparatus for rocking the apparatus along the lower edges of the curved blades to separate a layer of dough into separate multiple dough products.

6 Claims, 2 Drawing Sheets

DOUGH CUTTING APPARATUS

BACKGROUND OF THE INVENTION

1. Field of the Invention

The present invention pertains to dough cutting apparatus. More specifically, the present invention pertains to improved dough cutting apparatus for manually cutting, in one step operation, multiple products of yeast dough.

2. Description of the Prior Art

In the typical procedure for baking of dough products the dough ingredients are mixed, kneaded, dusted with flour and then rolled out on a work table to a thickness of between ½" and ¾". Each dough product is then individually cut and placed on a greased sheet pan. The remaining dough scraps are gathered and reworked, using more flour, lessening the desired moisture content and altering the texture and quality of the baked product. Several pans of products may be baked, sometimes requiring three or more dough scrap reworkings to utilize all the dough. Each reworking of the dough increases the product making and baking time. As can be easily understood, this process is very cumbersome, labor intensive and time consuming and frequently does not provide a uniform quality product.

Many breakfast type restaurants, motels, hotels, cafeterias, schools, colleges, military installations, prisons, etc. may bake and serve thousands of individual baked products a day. Most are still cutting dough the old fashioned way with hand held individual unit cutters. Certainly improvements are needed.

SUMMARY OF THE PRESENT INVENTION

The present invention provides manual dough cutting apparatus for cutting a layer of dough into multiple uniformly sized separate dough products in a one step operation for immediate baking and without leftover cuttings or scraps. The apparatus comprises multiple uniform size cavities formed by a plurality of longitudinally disposed spaced apart blades and transversely disposed spaced apart blades. The lower edges of all the blades taper upwardly from a fine edge to a width sufficient to displace and separate a layer of dough into separate dough products. Lower edges of the longitudinally disposed blades are uniformly curved from one end to the other as the rockers on a rocking chair. The lower edges of the transversely disposed blades are straight and even with adjacent lower edges of the longitudinally disposed blades. A handle may be attached to the upper part of the apparatus for engagement by the user, when the apparatus is placed on a layer of dough, for rocking the apparatus on the curved lower edges of the longitudinally disposed blades to separate the layer of dough into separate uniformly sized products corresponding with the multiple cavities formed by the blades.

With the dough cutter of the present apparatus, the dough ingredients are mixed, kneaded, dusted with flour and rolled out. The dough goes immediately into a baking pan. This eliminates rolling out on a work table. Then the dough is cut in one step by rocking the improved dough cutter of the present invention directly on the dough layer in the baking pan. This eliminates labor intensive individual cutting. There are no dough scraps to be reworked, eliminating waste and preserving quality of the product. The baking pan is then placed in the oven. At the end of the baking time the product is separated into individual uniformly sized product of uniform quality. Other objects and advantages of the invention will be seen in the description which follows in conjunction with the accompanying drawings.

DESCRIPTION OF A PREFERRED EMBODIMENT OF THE INVENTION

Referring to all of the drawings, the dough cutting apparatus A of the present invention comprises a plurality, three in the exemplary embodiment, of longitudinally disposed spaced apart blades 1, 2, 3 having upper and lower edges. The lower edges of the blades 1, 2 and 3 are uniformly curved from one end to the other resembling the rocker of a rocking chair as best seen in FIG.'s 1, 3 and 4.

There are also a plurality, five in the exemplary embodiment, of transversely disposed spaced apart blades 4, 5, 6, 7, 8 having upper and lower edges. The lower edges of the transverse blades 4, 5, 6, 7, and 8 are straight and even with adjacent lower edges of the longitudinally disposed blades 1, 2 and 3. The longitudinal and transversely disposed blades 1–8 cooperate to form multiple uniformly sized cavities, twenty-four in the exemplary embodiment, therebetween. The lower edges of all the blades 1–8 taper upwardly from a fine edge to a width sufficient to displace and separate a layer of dough into separate dough products.

It will be noted that although the lower edges of the longitudinal blades 1, 2 and 3 are curved, and the lower edges of the transverse blades 4–8 are straight but at different elevations, the upper edges of all the blades 1–8 lie in a single plane. Although it is not required, a rectangular frame 16 may be provided around the periphery of the apparatus A for attachment to the ends of both the longitudinal and transverse blades 1–3 and 4–8, respectively. Handles 17 and 18 are attached on the upper side of the apparatus A for engagement by the hands 19 and 20 of the user. The apparatus can be formed of any number of suitable materials metal, plastic, etc.

Figure 1:
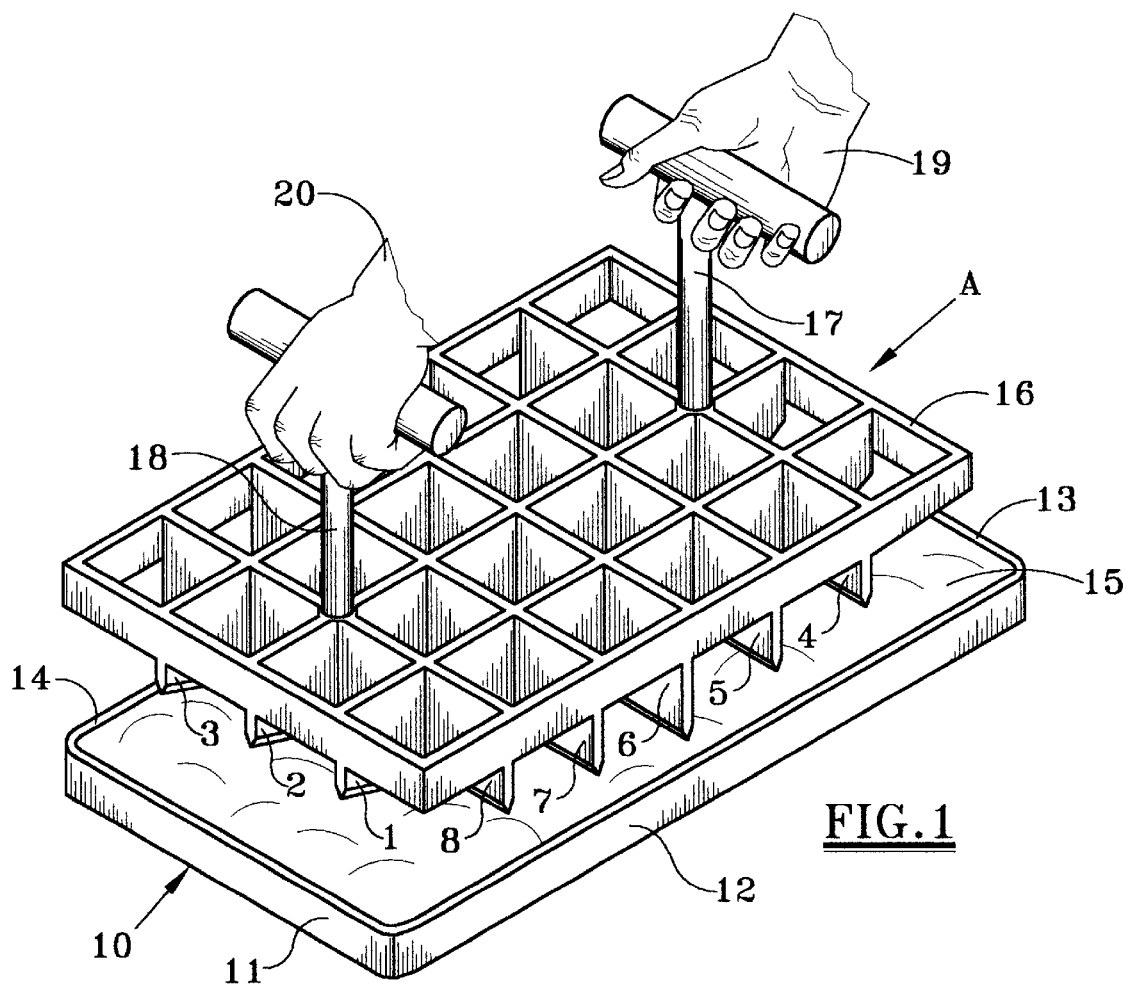
FIG. 1 is an isometric view of the dough cutting apparatus of the present invention illustrating its use in cutting a layer of dough placed in a baking pan.
Figure 2:
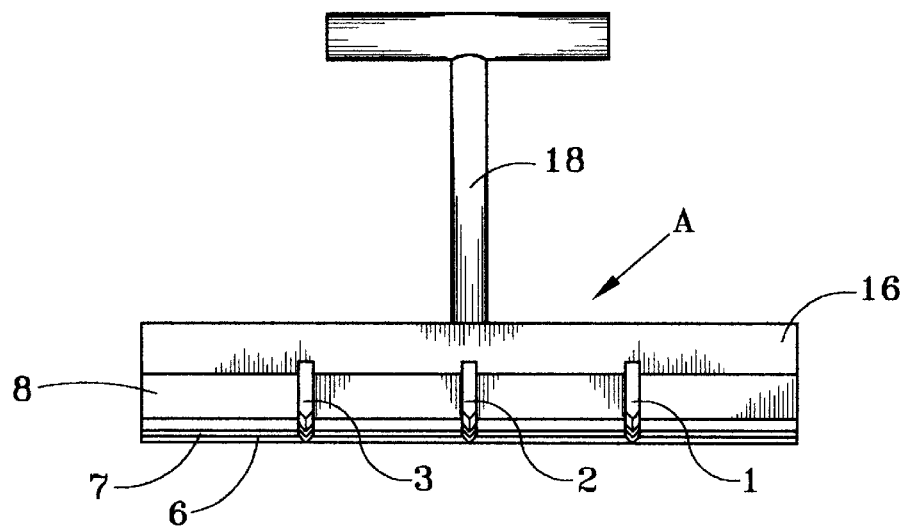
FIG. 2 is an end elevation of the dough cutting apparatus of the present invention.
Figure 3:
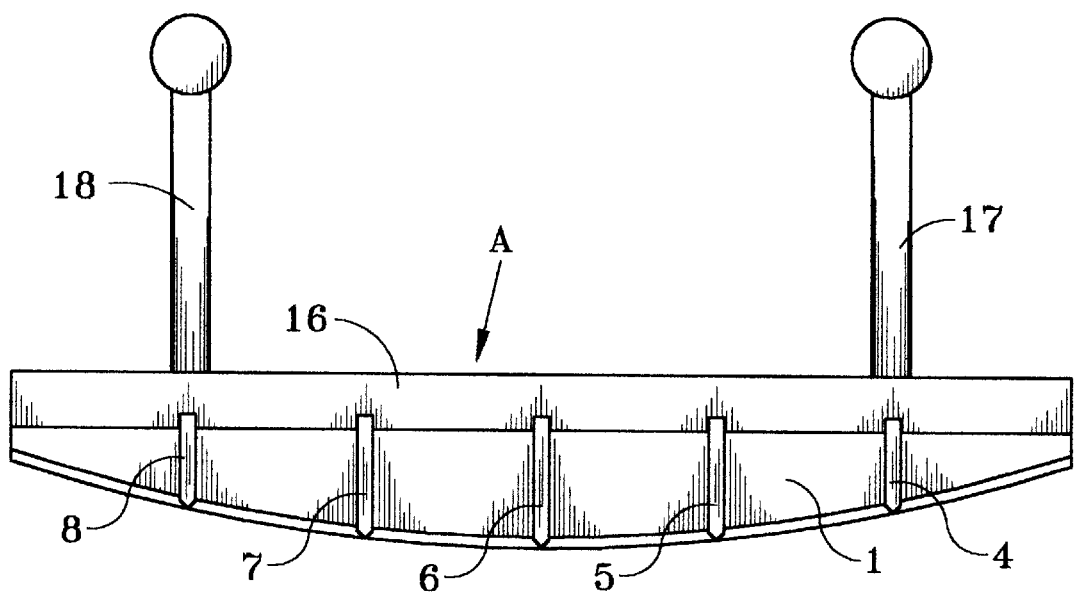
FIG. 3 is a side elevation of the dough cutting apparatus of the present invention.
Figure 4:
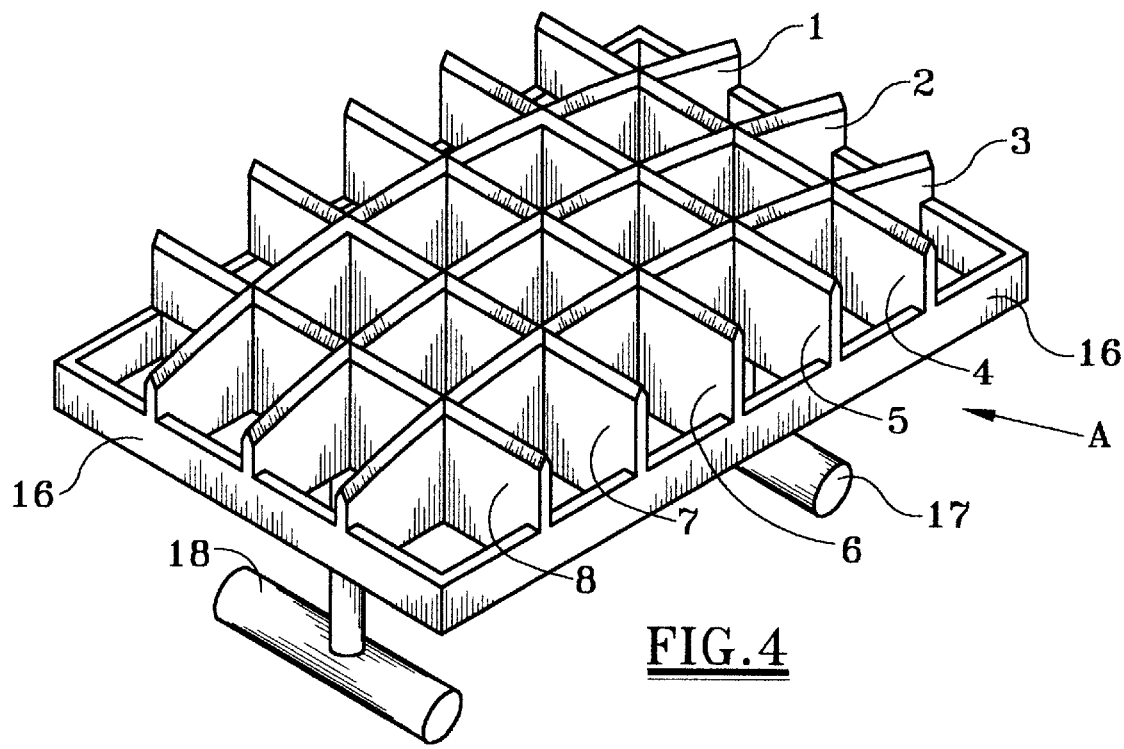
FIG. 4 is an isometric view of the bottom of the dough cutting apparatus of the present invention.

For completing a description of the cutting apparatus A of the present invention, reference is specifically made to the baking pan 10 in FIG. 1. As illustrated the baking pan 10 is a ½sheet pan having surrounding sides 11, 12, 13 and 14. A layer of dough 15 is shown placed in the pan 10.

Once the dough is kneaded and preworked it is placed in a teflon coated or non-stick pan such as the dough 15 in pan 10 of FIG. 1. The handles 17 and 18 are grasped by the hands 19 and 20 of the user and pressed into the pan of dough. The apparatus A is rocked once or twice along the curved lower edges of the blades 1, 2 and 3 and removed. The longitudinal blades 1–3, the transverse blades 4–8 and the sides 11–14 of the pan 10 all cooperate to form multiple (twenty-four in the exemplary embodiment) dough products ready to place in the oven. There are no leftover scraps. When the dough is finished baking, the biscuits or other baked items are removed from the pan for individual presentation of uniform size and quality.

Thus, the improved dough cutting apparatus of the present invention provides a dough cutter which eliminates rolling the dough on a work table, eliminates labor intensive individual cutting, eliminates waste and preserves quality. It is especially suitable for restaurants, cafeterias and large institutions which serve numerous baked products every day.

A single embodiment of the invention has been described herein. However, many variations may be made by those skilled in the art without departing from the spirit of the invention. For example, the blades may be positioned so that the products formed will be square, rectangular, diamond shaped, triangular, circular or many other shapes. Accordingly, it is intended that the scope of the invention be limited only by the claims which follow.

What is claimed is:

1. A dough cutting and baking apparatus comprising:

a baking pan having a rectangular bottom around the edges of which are provided upwardly extended surrounding sides and into which a layer of dough is placed;

a dough cutter having first and second sets of spaced apart blades; said first set of spaced apart blades having upper and lower edges, said lower edges of which are uniformly curved from one end to the other; said second set of spaced apart blades intersecting said first set of spaced apart blades and having upper and lower edges, said lower edges of which are straight and even with adjacent lower edges of said first set of spaced apart blades to form uniformly sized cavities therebetween; and handle means attached to said dough cutter for engagement by a user of said apparatus when said cutter is placed on said layer of dough in said baking pan for rocking said dough cutter, on said rectangular bottom, along said lower edges of said first set of spaced apart blades to separate said layer of dough into separate dough products corresponding with said uniformly sized cavities, and for removing said dough cutter to allow immediate placement of said baking pan and said dough products thereon into an oven for baking.

2. Dough cutting and baking apparatus as set forth in claim 1 in which the lower edges of all said dough cutter blades taper upwardly from a fine cutting edge to a width sufficient to displace and separate said layer of dough into said separate dough products.

3. Dough cutting and baking apparatus as set forth in claim 1 in which said upper edges of all said dough cutter blades lie in a single plane.

4. Dough cutting and baking apparatus as set forth in claim 1 in which the length of said first set of spaced apart blades and said second set of spaced apart blades correspond, respectively, with the length and width of said baking pan.

5. Dough cutting and baking apparatus as set forth in claim 4 in which at least the lower edges of both ends of said first and second set of spaced apart blades are free so that the outermost of said dough products are formed by said ends of said blades and said surrounding sides of said baking pan in which said layer of dough is placed.

6. Dough cutting and baking apparatus as set forth in claim 5 in which a frame is attached to the upper edges of said ends of said first and second set of spaced apart blades to form an outer periphery of said dough cutter.

* * * * *